Oct. 4, 1966  C. C. BULETTI ET AL  3,276,551
VEHICLE EMERGENCY BRAKE
Filed May 18, 1964  4 Sheets-Sheet 1
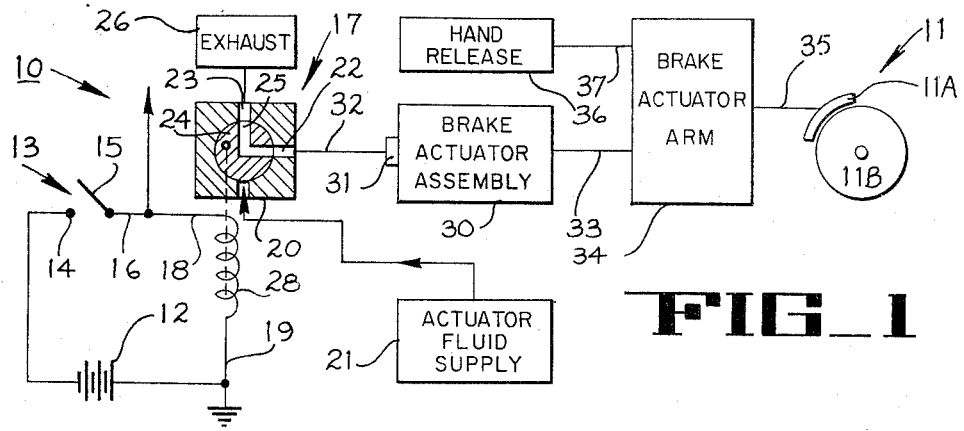
FIG_1
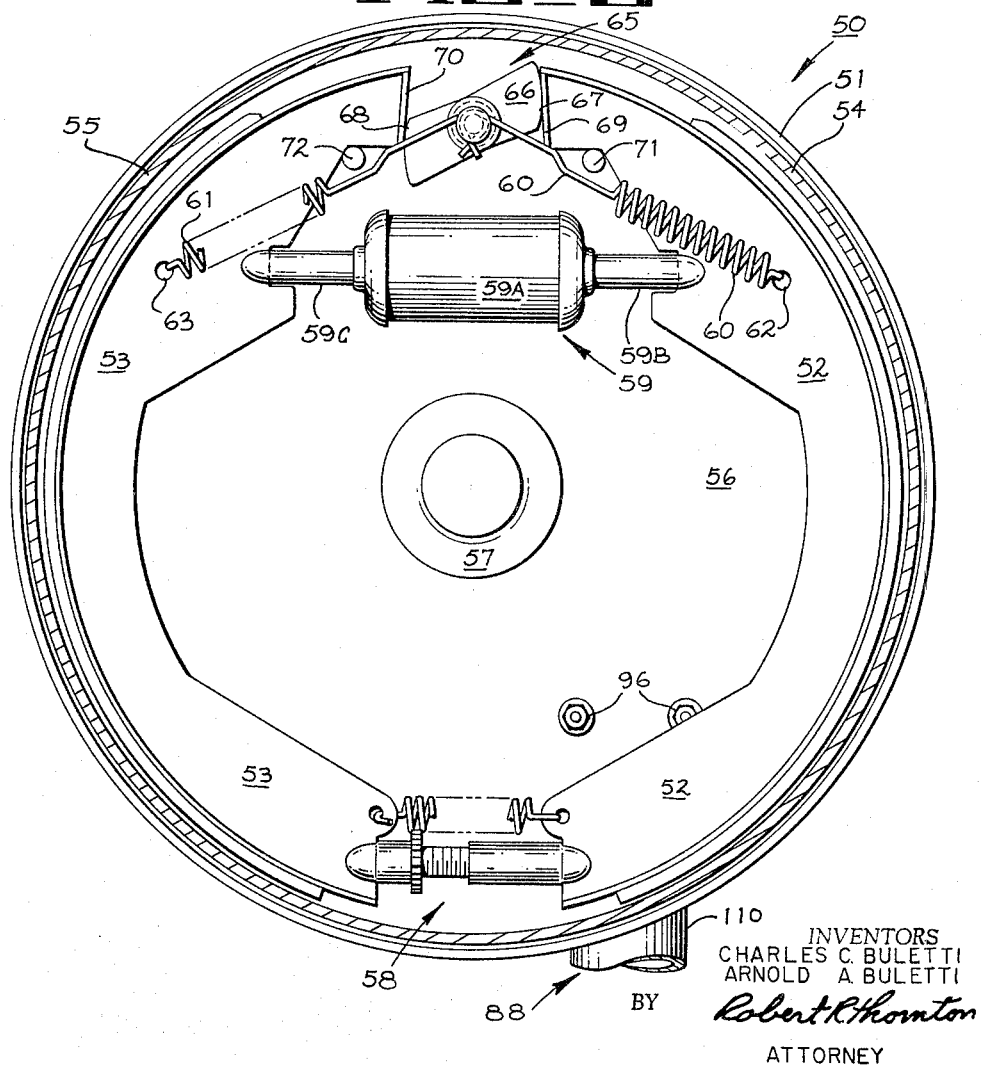
FIG_2
INVENTORS
CHARLES C. BULETTI
ARNOLD A. BULETTI
BY Robert R. Thornton
ATTORNEY

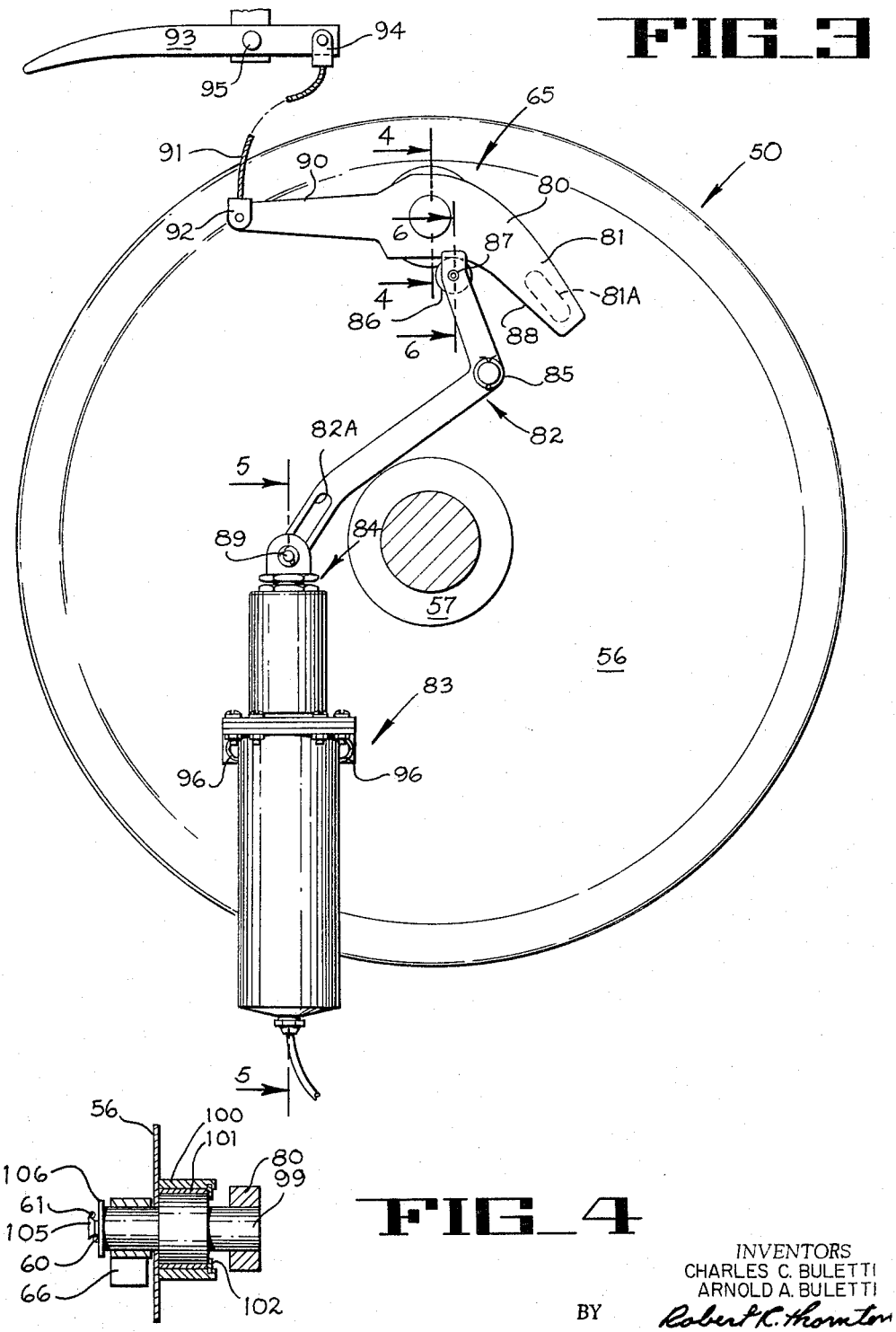

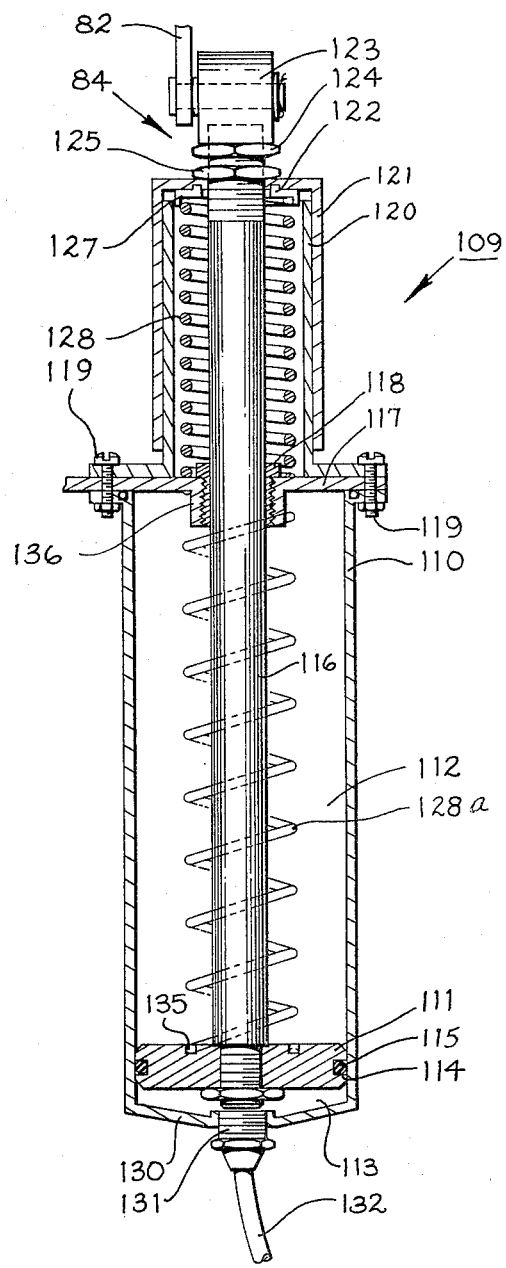

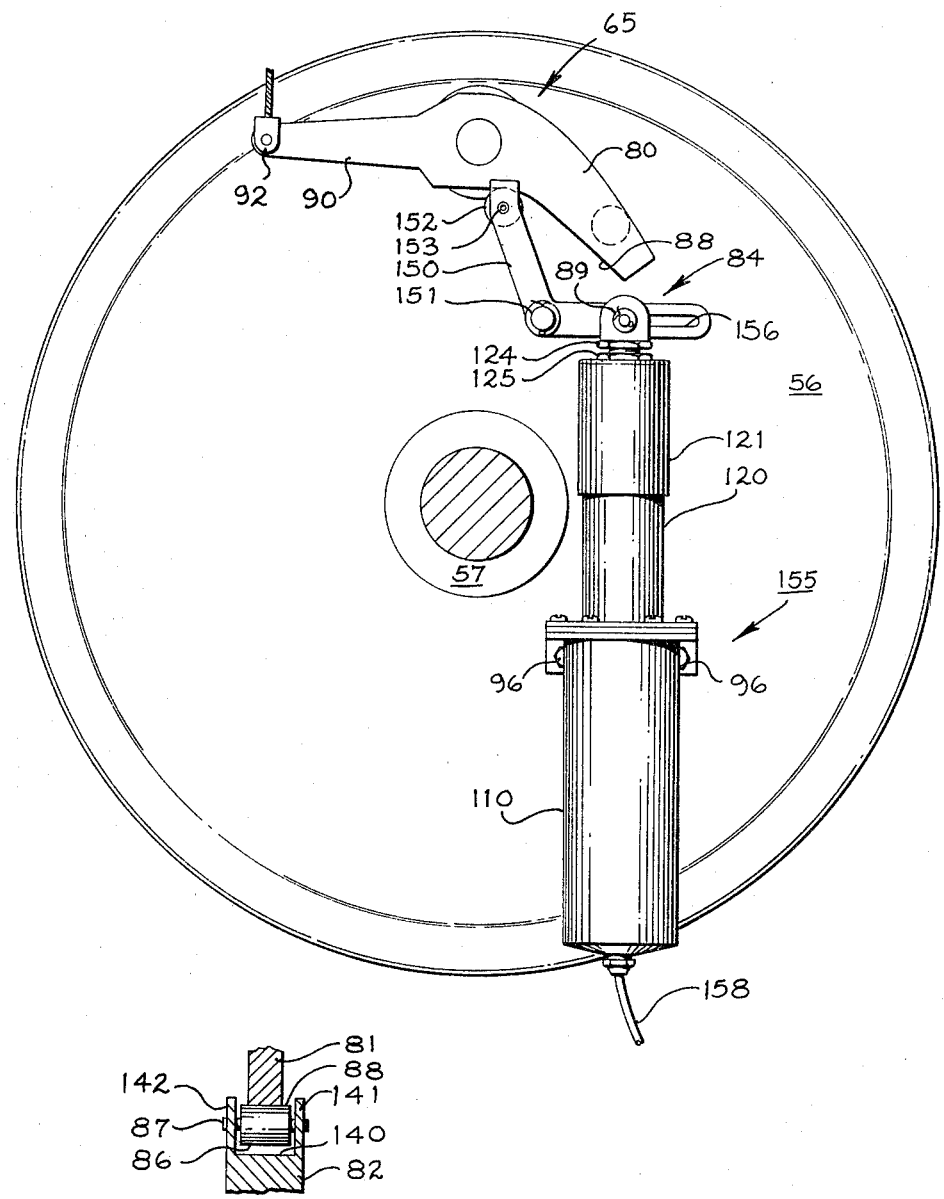

United States Patent Office 3,276,551
Patented Oct. 4, 1966

3,276,551
VEHICLE EMERGENCY BRAKE
Charles C. Buletti, 1206 Magnolia Ave., Willits, Calif.,
and Arnold A. Buletti, 7747 Isabel Drive, Cotati, Calif.
Filed May 18, 1964, Ser. No. 368,092
1 Claim. (Cl. 188—78)

This invention relates to an emergency brake for motor vehicles, and more particularly to such a brake which is automatically applied and may be selectively released.

Vehicles, such as automobiles, trucks, and the like, are normally equipped with an emergency brake as a matter of course. Such emergency brakes may take any one of a number of forms, but conventionally rely upon the manual actuation of the brake itself. For example, in the conventional automobile, the emergency or parking brake, is a brake in which the rear wheel brake shoe linings are pressed against the brake drums by physically moving a pivoted brake handle or foot pedal. Such a brake only applies a braking force to the rear wheels of the vehicle, and thus does not make use of the major portion of the braking effect available. Various devices have been devised to automatically apply such an emergency brake. For example, the system described in U.S. Patent No. 2,789,667 is such a brake.

In order to increase the effective braking available in an emergency brake, efforts have been made to apply emergency braking to additional wheels of the vehicle, each of the four wheels of an automobile, for instance. An example of such a device utilizable in vehicles having pressurized hydraulic or pneumatic braking systems is described in U.S. Patent No. 2,409,908. Such emergency braking systems provide a significant safety factor in vehicle operation. However, they have not come into widespread use, particularly with respect to small motor vehicles of the passenger type. This lack of acceptance is due to the comparatively great expense involved in installing such systems, and the lack of adaptability of such systems to the conventional construction of small passenger vehicles. Automatically operated emergency braking systems have been receiving increased acceptance in the trucking and bus transportation industries, however, even though such systems have been comparatively expensive and have been lacking in positive control over the application and release of emergency braking. An attempt to provide such control is contained in U.S. Patent No. 3,093,213.

According to the present invention, an emergency braking system, employing coanventional basic brake construction, utilizes an actuator member to ride against the brake shoe ends to force the brake shoes toward the brake drum, thus applying emergency braking to the individual wheels. This actuator member is rotated between a braking and a release position by means of a pivoted actuator arm, to which the actuator member is connected. Movement of the actuator arm is controlled by an actuator assembly. The actuator assembly is actuated by the application of an actuator fluid or vacuum, as appropriate, for the particular type of supply available in the vehicle. Selective release of the emergency brake system is accomplished through the counter-rotation of the actuator cam, so as to permit the brake shoes to return to their normal position. This counter-rotation is produced in response to the movement, by the driver, of a brake release handle, which is connected to the actuator arm so as to move the actuator arm in opposition to the movement applying emergency braking. The actuator arm thus functions as a lever, movement of which selectively applies or releases the emergency brake. In the preferred embodiment, the actuator arm actually consists of a first-class lever, although second- or third-class levers, or the mechanical equivalents of levers, are also utilizable in the practice of the invention.

The invention may be more readily understood by referring to the accompanying drawing in which:

FIGURE 1 is a block diagram of the components of an automobile emergency brake system according to the present invention;

FIGURE 2 is a side elevation of a wheel brake assembly utilizable in the system illustrated in FIGURE 1;

FIGURE 3 is a side elevation of an actuator arm and associated components utilizable in the present invention;

FIGURE 4 is a sectional view taken along lines 4—4 of FIGURE 3;

FIGURE 5 is a view in section of a brake actuator assembly utilizable with the present invention taken along line 5—5 of FIG. 3;

FIGURE 6 is a partial elevation taken along lines 6—6 of FIGURE 3; and

FIGURE 7 is a side elevation of an alternate embodiment of an emergency wheel brake utilizing the present invention.

Referring now to FIGURE 1, a vehicle emergency brake assembly 10 includes a conventional brake 11, vehicle battery 12, and ignition switch 13. The positive terminal of the battery 12 is connected to ground and the negative terminal of the battery 12 is connected to a terminal 14 of the ignition switch 13. The ignition switch has a switch arm 15 which contacts the terminal 14 when the switch is closed so as to apply a negative potential to an ignition system lead 16. A spring-loaded three-way solenoid valve 17 of conventional construction is shown diagrammatically as connected to the switch 15 by a lead 18. Circuit continuity is provided by a lead 19 connected between the solenoid valve 17 and the positive battery terminal.

The valve 17 has an inlet port 20 connected to an actuator fluid supply 21. The actuator fluid supply provides either vacuum or a hydraulic or pneumatic fluid under pressure. The valve 17 has a first outlet port 22 and a second outlet port 23. A valve body 24 disposed within the valve 17 has a valve body passage 25 disposed therein. The valve 17 is shown in its de-energized position, in which the outlet ports 23 and 22 are connected by the valve body passage 25. The second outlet port 23 is connected to an exhaust 26, which may be simply a vent, in the case of a pneumatic or vacuum system, or which may be a sump, in the case of a hydraulic system. The valve 17 includes a valve actuating winding 28 which, when an electrical potential is applied thereto, causes the valve body 25 to rotate ninety degrees clockwise, so as to connect the first outlet port 22 to the inlet port 20 through the valve body passage 25. It is to be understood that the valve assembly 17 is shown for purposes of illustration only, and that any valve system with appropriate controls may be utilized in the practice of the embodiment of FIGURE 1. In certain embodiments, as will be pointed out specifically hereinafter, no valve at all is necessary.

The brake assembly 10 includes a brake actuator assembly 30 having an inlet 31, to which the actuating fluid communicates from the first outlet port 22 through a fluid transfer tube 32 connected therebetween. The brake actuator assembly 30 has a connecting linkage 33 connected to a brake actuator arm 34. Movement of the connecting linkage 33 controls movement of the brake actuator arm 34. The brake actuator arm 34 is connected to a brake shoe 11A by a brake actuator member 35. When the actuator fluid from the supply 21 is applied to the brake actuating assembly 30, as a result of energization of the valve 17, the connecting linkage 33 moves so as to move the brake actuator arm 34, thereby releasing the brake 11 through the actuator member 35.

Thus, the emergency brake is applied at all times unless sufficient actuator fluid supply pressure or vacuum, as appropriate, exists and the ignition switch is turned on.

A brake release 36 is connected to the brake actuator arm 34 by a brake release member 37. The brake release 36 is actuated by the driver to overcome the movement of the brake actuator arm 34 which would otherwise apply the brake.

FIGURE 2 illustrates, in elevation, an automobile brake assembly 50, for use in the present invention. In the brake assembly 50, a conventional brake drum 51 encloses a pair of brake shoes 52, 53. The brake shoe 52 has a brake lining 54 attached thereto by conventional means, and, similarly, the brake shoe 53, a brake lining 55. The brake drum 51 is mounted on a conventional anchor plate 56 having an aperture 57 through which the axle of the vehicle passes. The brake shoes 52, 53 are connected together at one end by a conventional brake adjustment screw and spring assembly 58. At the opposite end, a conventional brake cylinder assembly 59 has a brake cylinder 59A and brake actuator arms 59B and 59C connected between the brake shoes 52, 53 in the conventional manner. In order to apply braking to the assembly 50 under normal conditions, the brake cylinder 59A is subjected to hydraulic or pneumatic pressure by depressing the vehicle brake pedal, thus spreading the arms 59B, 59C to press the brake linings 54, 55 against the brake drum 51. Upon release of this hydraulic or pneumatic pressure, the brake shoes 52, 53 are returned to their original position by the urging of a brake return spring. In FIGURE 2, a first brake return spring 60 and a second brake return spring 61 are connected between an emergency brake actuator arm 65 and the brake shoes 52, 53 through apertures 62, 63, respectively, formed in the brake shoes 52, 53, the emergency brake actuator arm 65 corresponds to the brake actuator arm 34 of FIGURE 1. The emergency brake actuator arm 65 has a cam 66 fixed thereto. The cam 66 corresponds to the brake actuator 35 of FIGURE 1 and has a first camming surface 67 and a second camming surface 68 formed thereon. The first camming surface 67 engages a brake shoe butt surface or plate 69 at the end of the brake shoe 52. The second camming surface 68 engages a similar butt surface or plate 70 on the brake shoe 53. The brake return springs 60, 61 urge the butt plates 69, 70 against the camming surfaces 67, 68. Guide pins 71, 72, extending outwardly from the anchor plate 56, center the brake shoes 52, 53 in the de-energized position. The actuator arm 65 is rotatable, as will be explained with respect to FIGURES 3 and 4. When the actuator arm 65 is rotated clockwise as viewed in FIGURE 2, the camming surfaces 67, 68 urge the butt plates 69, 70 apart, thus moving the brake shoes 52, 53 to force the brake linings 54, 55 against the brake drum 51. When the actuator arm 65 is rotated counterclockwise, as viewed in FIGURE 2, the brake linings 54, 55 are withdrawn from the brake drum 51 by the urging of the brake return springs 60, 61.

FIGURE 3 is an elevational view of the brake assembly 50 when viewed from the opposite side of the anchor plate 56 as that shown in FIGURE 2. The emergency brake actuator arm 65 has a body portion 80, which includes a cam lever 81. The cam lever 81 is moved counterclockwise, as viewed in FIGURE 4, to actuate the emergency brake. A cam lever actuator 82 is connected to a brake actuator assembly 83, corresponding to the brake actuator assembly 30 of FIGURE 1, by a connecting rod 84, corresponding to the connecting rod 33 of FIGURE 1. The cam lever actuator 82 has a pivot 85 attached to the anchor plate 56 and about which the actuator 82 pivots. A roller 86 is disposed in a bifurcation (see FIGURE 6) in the actuator 82 and is connected thereto by a pin assembly 87, so that the roller 86 rides against a camming surface 88 on the cam lever 81. The cam lever actuator 82 is connected to the connecting rod 84 by a pivotal connection 89. A slot or aperture 82A in the actuator is utilized to convert the linear motion of the connecting rod 84 to angular displacement of the actuator 82.

In the embodiment shown in FIGURE 2, the emergency brake is applied by causing the connecting rod 84 to move out of the actuator assembly 83. The cam lever actuator 82 then pivots, thereby causing the roller 86 to move along the camming surface 88 and move the lever arm 81 in a counterclockwise direction, as viewed in FIGURE 3. This rotation of the lever arm 81 rotates the cam 66 to actuate the brake, as has been previously described. Thus, FIGURE 3 illustrates the emergency brake assembly 50 in its off condition. If desired, the connecting rod 84 can be connected directly to the actuator arm 81 by means of an aperture 81A, shown in dotted lines in FIGURE 3, although such an embodiment does not provide the lever advantage of the embodiment previously described. For certain applications, it may be desirable to include a positive return, such as a spring connected to the lever arm 81, to insure release of the emergency brake.

The body portion 80 has a brake release lever 90, to which a brake release cable 91 is connected by a release shackle 92. The brake release cable 91 extends to a brake release handle 93, and is attached thereto by a shackle 94. The brake release handle 93 pivots about an anchor pin 95, and is mounted, preferably, under the dashboard of the vehicle, so as to permit easy operation by the driver. When the release handle 93 is depressed, that is, rotated counterclockwise, as shown in FIGURE 3, the body portion 80 is rotated clockwise, overcoming the urging of the connecting rod 84 and actuator 82. The cam 66 is thereby rotated in a direction which releases the emergency braking by permitting the brake lining to retract from the brake drum under the urging of the brake return springs 60, 61. So long as the connecting rod 84 and actuator 82 urge the body portion 80 in a counterclockwise direction, however, emergency braking is again immediately applied upon release of the brake handle 93. As shown in FIGURE 3, the actuator assembly 83 is attached to the anchor plate 56 by bolts 96, although the assembly 83 can be attached to convenient fixed surface.

FIGURE 4 is a cross-sectional view of the brake actuator arm 65 illustrating the manner in which the cam lever 81 is attached to the cam 66. The cam 66 is mounted on an axle 99 by any conventional means. The axle 99 extends through the anchor plate 56 and is rotatably held with respect thereto by a sleeve 100 containing a bushing 101. A lock ring 102 holds the bushing within the sleeve 100. The body portion 80, which includes the cam lever 81 and the brake release lever 90 (not shown) is attached to the axle 99 by any conventional means. Thus, rotation of the cam lever 81 causes the cam 66 to rotate. The axle 99 has a recessed tip portion 105 which receives the brake return springs 60, 61 (see FIGURE 2). A conventional brake shoe guide 106 (not shown in FIGURE 2 for reasons of clarity) of generally elliptical configuration is shown in FIGURE 4, and the brake shoe butt plates 69, 70 are retained between the brake shoe guide 106 and the anchor plate 56, so as to restrict their lateral movement.

Referring now to FIGURE 5, there is shown in elevation, in cross-section, of a piston and cylinder assembly 109 suitable for use as the brake actuating assembly 83. The assembly 109 includes a cylinder 110, within which a piston 111 is mounted so as to form a first fluid chamber 112 and a second fluid chamber 113. The piston has a recess 114 formed around its periphery, within which an O-ring 115 is disposed, so as to seal the piston 111 with respect to the cylinder 110. A piston rod 116 extends from the piston 111 through an end closure plate 117. A seal 118 seals the piston with respect to the end closure plate, so that the piston may move reciprocally while maintaining the first fluid chamber 112 in a sealed condition. Nut and bolt combinations 119 attach a spring cylinder 120 to the closure plate 117 and cylinder 110 by appropriate flanges. A spring cap 121 encloses a portion of the spring cylinder 120 and is screwed onto a threaded end 122 of the piston rod 116. A shackle fitting 123 is also attached to the piston and threaded end 122, and is held in place by means of a lock nut 124. The cap 121 is held in position on the piston rod 116 by means of a lock nut 125. The cap has an annular recess, within which a spring cup 127 is fitted. An actuating spring 128, under compression, is disposed within the spring cylinder 120 so as to extend between the spring cup 127 and the closure plate 117; thus, the spring 128 urges the piston 111 toward the plate 117. The cylinder 110 has a closed end portion 130, within which an inlet fitting 131 is disposed. The inlet fitting connects the second fluid portion 113 to an actuating fluid supply tube 132, corresponding the tube 33 of FIGURE 1. By application of a vacuum to the second fluid chamber 113 through the tube 132, the piston is drawn toward the cylinder end portion 130, against the urging of the spring 128, thus de-actuating the brake assembly described with respect to FIGURE 3.

FIGURE 6 is a view in section taken along line 6—6 of FIGURE 3, illustrating the structure of the bifurcation in the cam lever actuator 82, previously referred to with respect to FIGURE 3. In FIGURE 6, the cam lever actuator 82 has a bifurcation 140 formed at the extremity thereof, so that a pair of arms 141, 142 have the roller 86 and camming surface 88 disposed therebetween. The roller 86 is free to rotate about the pin 87 during movement of the cam lever actuator 82. While FIGURE 6 shows the preferred embodiment for actuating the cam lever 81 along the camming surface 88, other structures will be obvious to those skilled in the art and the structure of FIGURE 6 is therefore to be considered by way of example rather than by way of limitation as to the invention in its broadest aspects.

The embodiment of the brake actuator assembly shown in FIGURE 5 utilizes a vacuum to de-actuate the brake assembly. The device of FIGURE 5 can be modified for use in conjunction with a pressurized fluid system for actuating an emergency brake assembly according to the invention. An embodiment utilizing such a modification is shown in FIGURE 7.

In FIGURE 7, a cam lever actuator 150 rotates about a pivot 151 attached to the anchor plate 56 of the vehicle wheel assembly. The cam lever actuator 150 has a roller 152 attached thereto by a pin assembly 153, the structure of the cam lever 150 at the roller 152 being similar to that shown in FIGURE 6. A brake actuator assembly 155 is attached to the anchor plate by bolts 96 and has a connecting rod 84 extending therefrom and attached to the cam lever actuator 150 by pivot 89 extending through a slot 156 formed therein. A pressure inlet tube 158 is connected to the bottom of the brake actuator assembly 155. The brake actuator assembly 155 utilizes a pressurized fluid to de-actuate the brake against the urging of a compression spring.

For use with a pressurized fluid (see FIGURE 5), a spring 128A (shown in dotted lines) is disposed within the first fluid chamber 112, so as to extend between the plate 117 and piston head 111. In order to seat the spring against the piston head 111, an annular recess 135 is formed thereon so as to open into the first fluid chamber 112. The closure plate 117 has a shoulder portion 136 which is enclosed by the spring 128A in order to seat the spring. The application to the second fluid chamber 113 of a pressurized fluid, either hydraulic or pneumatic, through the tube 132 then moves the piston 111 away from the end closure 130 against the urging of the spring 128A, thus moving the piston rod 116 so as to release the brake. When the pressure of the fluid applied to the second fluid chamber 113 decreases below the opposing pressure exerted by the spring 128A, the piston 111 will move toward the closed end portion 130, thus causing the brake to be actuated.

The modified system just described may be used without a control valve such as the valve 17 of FIGURE 1 in conventional hydraulic or pneumatic pressurized braking systems in order to automatically apply the emergency brake if brake actuating pressure is lost. In a conventional automobile, however, no special pressurized hydraulic or pneumatic brake system or vacuum brake system ordinarily exists. The brake system of FIGURE 3 can be utilized in the conventional automobile, however, by connecting the tube 132 to the manifold of the automobile engine. The emergency braking system will then be applied whenever the engine is off. Emergency braking is thus accomplished simply by turning off the automobile engine through the conventional ignition system, but without the valve 17 of FIGURE 1. The vacuum actuated braking system previously described with respect to FIGURE 3 can be utilized directly with conventional vacuum actuated braking systems by connecting the vacuum inlet line 132 directly to the brake vacuum source. Alternatively, the system can be used with an ignition lock system modified to include an additional set of electrical contacts and switch position to control the valve 17 of FIGURE 1. In such an embodiment, a separate vacuum supply is utilized. The supply may be taken from the main supply already available on the vehicle simply by connecting an auxiliary vacuum tank to the main supply by a one-way valve, such as a ball check valve or the like, so that the vacuum is communicated to the auxiliary tank and an actuator supply established therein. Such an embodiment can also be utilized in the conventional automobile by connecting the auxiliary tank to the engine manifold by the one-way valve. The motor can then be operated with the emergency brake applied by utilizing the additional contacts on the ignition switch to control application of the emergency brake independently of the on-off condition of the ignition. Preferably, such a system always applies the emergency brake when the ignition is off, and provides a position in which the emergency brake is applied with the ignition on and the engine running. This type of system can equally well be utilized with pressurized fluid braking systems by connecting the auxiliary tank to the source of pressurized fluid by a one-way valve operable to permit the pressurized fluid to pass into the auxiliary tank.

The braking systems described heretofore have actuated the cam 66 by means of an actuator arm 65 which is pivoted from the anchor plate 56 so as to form a first class lever, the pivot point being disposed intermediate of the camming surface 81 and the release shackle 92. However, it will be apparent that the actuator arm 65 may also be connected as a second or third class lever, so that the pivot is disposed at one end of the arm, and either the shackle or camming surface at the opposite end. If the actuator assembly 83 is connected to the actuator arm 65 directly, as by the connecting rod 84, a second or third class lever structure is readily available. The relative disposition of the points of attachment of the shackle and connecting rod in such an embodiment depend upon the specific structure involved. In the case of the use of a camming surface 88, the camming surface can extend on either side of the point of connection of the release shackle 92, so that the relative disposition changes as the brake is applied and released.

Furthermore, while the term lever is utilized herein, and levers are shown in the drawing, it will be apparent to those of ordinary skill in the mechanical arts that various mechanical equivalents of levers are equally applicable in the cam actuator. Thus, for example, one or both of the lever arms 80, 90 can be replaced by a rack and pinion arrangement. The term "lever," as used herein, then relates to the use of a lever or its equivalent as an actuator arm for the application and release of emergency braking to the wheel of a vehicle.

While the brake has been described as being applied to each wheel individually, the system of the invention can equally well be utilized to brake two or more wheels through appropriate mechanical linkages. In such an embodiment, it may be preferable to mount the actuator assembly and actuator arm at a location remote from any one wheel, but more centrally located with respect to the total number of wheels to be controlled by the individual system.

In its various embodiments, the invention not only constitutes an extremely reliable and effective emergency brake for all conventional brake systems for vehicles, but also provides a positive parking brake. Utilization of the invention enables the driver to readily release the emergency brake for so long a period as he may select, and have emergency braking re-applied immediately when desired. Thus, a vehicle, having lost its conventional brake control, may be driven or moved in complete safety and with complete control over the application of the vehicle brakes until such time as repairs can be effectuated. Furthermore, by utilizing the manual release of the emergency brake through a pivoted release handle, the actual amount of braking at any instant can be controlled. The driver need only vary the amount of displacement of the release handle to provide such control.

While the release handle has been described as being actuated by hand, it will be apparent that the handle can be replaced by a foot-operated member while providing the same control over emergency braking. Also, the brake release linkage between the actuator arm and the release handle may include various conventional power assist mechanisms, if desired, in order to decrease the force the driver is required to apply in order to overcome the emergency braking being applied.

The invention claimed is:

In a brake assembly of the type having an anchor plate to which a brake shoe is connected so as to be movable relative to a brake drum between an "off" position in which no braking is applied and an "on" position in which a brake lining fixed to the brake shoe is urged against the brake drum, the combination of:

camming means;

a camming surface formed on the brake shoe;

means connecting the camming means to the anchor plate so that the camming means is normally operable when actuated to engage and move said camming surface, whereby the brake lining is urged against the brake drum;

a camming means actuator for actuating said camming means and including a brake actuator arm pivotally connected to the anchor plate and fixed to the camming means so that angular displacement of the brake actuator arm angularly displaces the camming means to move the brake shoe;

a brake actuator assembly for normally controlling the angular displacement of the brake actuator arm;

brake release means operable when actuated to retract the brake lining from the brake drum in opposition to the actuated camming means actuator; and control means for selectively actuating the brake release means;

and in which the brake actuator assembly has a cam lever actuator, and the brake actuator arm has a cam lever arm with a camming surface engageable along its length by the cam lever actuator, whereby actuation of the brake actuator assembly initiates relative movement between the cam lever actuator and the cam lever arm so as to angularly displace the brake actuator arm.

References Cited by the Examiner
UNITED STATES PATENTS

| | | | |
|---|---|---|---|
| 2,031,062 | 2/1936 | Peabody et al. | 188—170 |
| 2,126,849 | 8/1938 | Weiss | 188—170 |
| 2,126,984 | 8/1938 | Bock | 188—106 |
| 2,270,431 | 1/1942 | Freeman | 188—170 |
| 2,375,392 | 5/1945 | Stelzer | 188—78 |
| 2,768,712 | 10/1956 | Phipps | 188—106 |
| 2,852,316 | 9/1958 | Staley | 188—170 |
| 2,881,872 | 4/1959 | Risk | 188—106 |

DUANE A. REGER, *Primary Examiner.*